(12) United States Patent
de la Cruz

(10) Patent No.: US 7,048,855 B2
(45) Date of Patent: May 23, 2006

(54) CROSS FLOW FILTRATION MATERIALS AND CARTRIDGES

(75) Inventor: Deborah de la Cruz, Vista, CA (US)

(73) Assignee: GE Osmonics, Inc., Minnetonka, MN (US)

( * ) Notice: Subject to any disclaimer, the term of this patent is extended or adjusted under 35 U.S.C. 154(b) by 220 days.

(21) Appl. No.: 10/451,584

(22) PCT Filed: Dec. 21, 2001

(86) PCT No.: PCT/US01/49889

§ 371 (c)(1),
(2), (4) Date: Jun. 20, 2003

(87) PCT Pub. No.: WO02/051528

PCT Pub. Date: Jul. 4, 2002

(65) Prior Publication Data

US 2004/0045892 A1    Mar. 11, 2004

Related U.S. Application Data

(60) Provisional application No. 60/257,859, filed on Dec. 22, 2000.

(51) Int. Cl.
*B01D 63/00* (2006.01)

(52) U.S. Cl. .......................... 210/321.74; 210/321.83; 210/483.83; 210/497.1; 210/494.1; 210/490; 210/493.4; 264/299; 264/DIG. 48; 427/245

(58) Field of Classification Search .......... 210/321.74, 210/321.83, 493.4, 497.1, 494.1, 490, 32.83, 210/493.83; 264/299, 298, DIG. 48; 96/6; 427/245

See application file for complete search history.

(56) References Cited

U.S. PATENT DOCUMENTS

| | | | |
|---|---|---|---|
| 3,397,790 A | 8/1968 | Newby et al. | 210/321 |
| 3,813,334 A * | 5/1974 | Bray | 210/321.83 |
| 3,894,166 A * | 7/1975 | Brown et al. | 427/316 |
| 4,033,878 A * | 7/1977 | Foreman et al. | 210/321.74 |
| 4,645,602 A | 2/1987 | Barnes, Jr. et al. | 210/490 |
| 4,664,801 A | 5/1987 | Thomas | 210/489 |
| 4,792,401 A | 12/1988 | Truex et al. | 210/644 |
| 4,795,559 A | 1/1989 | Shinjou et al. | 210/490 |
| 4,802,982 A | 2/1989 | Lien | 210/247 |
| 4,855,058 A | 8/1989 | Holland et al. | 210/652 |
| 4,906,372 A * | 3/1990 | Hopkins | 210/321.74 |
| 4,963,303 A * | 10/1990 | Anderson | 264/41 |
| 5,034,126 A * | 7/1991 | Reddy et al. | 210/321.74 |
| 5,258,203 A | 11/1993 | Arthur | 427/245 |
| 5,266,195 A * | 11/1993 | Hopkins | 210/321.74 |
| 5,397,632 A | 3/1995 | Murphy, Jr. et al. | 428/284 |
| 5,435,957 A | 7/1995 | Degen et al. | 264/162 |
| 5,500,167 A | 3/1996 | Degen | 264/41 |
| 5,500,247 A | 3/1996 | Hagqvist | 427/244 |
| 5,804,280 A | 9/1998 | Pall et al. | 428/137 |
| 5,897,779 A | 4/1999 | Wisted et al. | 210/651 |
| 6,090,441 A | 7/2000 | Vining, Jr. et al. | 427/244 |
| 6,156,680 A | 12/2000 | Goettmann | 442/344 |
| 6,280,791 B1 | 8/2001 | Meyering et al. | 427/244 |
| 6,565,747 B1 * | 5/2003 | Shintani et al. | 210/321.74 |
| 6,617,126 B1 * | 9/2003 | Horn | 435/34 |
| 6,673,242 B1 * | 1/2004 | Herron | 210/321.74 |

FOREIGN PATENT DOCUMENTS

DE    4025768 A1    2/1992

* cited by examiner

*Primary Examiner*—Ana M. Fortuna
(74) *Attorney, Agent, or Firm*—Fitch, Even, Tabin & Flannery

(57) ABSTRACT

Cross flow filtration cartridges are made using semipermeable membrane of sheet formation that was cast upon an integral polymeric fibrous support material which exhibits excellent permeate flow in the plane thereof and serves as both backing material and permeate carrier. A fibrous support having a thickness between about 0.4 mm and about 2 mm and at least one surface region with a mean pore size no greater than about 300 microns has a semipermeable membrane cast in situ thereupon from a liquid solution. After gelling to form a polymeric semipermeable membrane, the product is spirally wound about a porous tube in association with feed-passageway-providing sheet material, but in the absence of any separate permeate carrier, to form an effective cross-flow filtration cartridge wherein the feed flow may be spiral and the permeate discharge through one of the side edges.

21 Claims, No Drawings

CROSS FLOW FILTRATION MATERIALS AND CARTRIDGES

This application is the National Stage of International Application No. PCT/US01/49889, filed Dec. 21, 2001, which claims the benefit under 35 U.S.C. Section 119(e) of U.S. Provisional Application 60/257,859, filed Dec. 22, 2000.

This invention relates to a method for making semipermeable membrane materials of sheetlike form having an integral support layer which allows excellent permeate flow in the plane thereof so as to be particularly useful in cross flow filtration applications for separations, and to novel cross flow cartridges that can particularly utilize constructions incorporating such membranes.

FIELD OF THE INVENTION

This invention is primarily concerned with improving backing materials used on the permeate side of sheetlike membranes for cross flow filtration to provide materials having excellent liquid transport in the plane thereof, e.g. for flow to a collection region in a spiral wound semipermeable membrane cartridge. Such cross flow materials would be particularly useful for reverse osmosis (RO), nanofiltration (NF) or ultrafiltration (UF) processes, and more particularly these materials should provide more efficient methods for making cartridges for cross flow filtration, and improved cartridges should result.

BACKGROUND OF THE INVENTION

RO and UF membranes for the separation of a liquid from a second component, such as another liquid or dissolved or suspended solids, have been known for many years, and a variety of semipermeable membranes have been developed for use in such RO and UF processes. More recently, semipermeable NF membranes have been developed, and membranes useful in these three processes are generally referred to hereinafter as cross flow (CF) membranes which is meant to indicate that they are intended for use in cross flow filtration processes, e.g. spiral wound cartridges and the like wherein the flow is past a semipermeable membrane surface and a concentrate stream is withdrawn from an opposite end of the feed flow path. These membranes, while satisfactory in achieving such separations, must be incorporated into a cartridge or filter module of some sort to provide a practical realization of the potential membrane performance. Several shortcomings of conventional CF filtration modules have been noted, some of which result from particular combinations of the semipermeable membrane and other material layers that are adjacent to, and often in contact with, the membrane to provide the needed liquid flow patterns.

As an example, RO cartridges of the spiral wound type have employed various materials as backing and permeate carriers for separately cast semipermeable membranes, which combinations were commonly wound together with brine-side spacers to create a spiral cross flow assembly. One type of backing material advocated for use in the early days of cartridge development comprised particles of an incompressible substance, such as glass beads, attached to a porous substrate, as described in U.S. Pat. No. 3,367,505. A more common type of backing material that has been used for many years as a permeate carrier is an epoxy-impregnated tricot which is often sandwiched as a single layer permeate carrier between two sheets of separately produced semipermeable membrane that have been cast on appropriate backing layers and then joined at their edges to create an envelope about the permeate carrier.

Permeate carriers withdraw the permeate from the low-pressure side of the semipermeable membrane and carry it to an exit. In general, two areas where improvements have been sought in such cross flow filtration systems are (a) in the throughput, or rate of collection, of permeate and (b) in the maintenance interval or service life of the filtration equipment; these two areas are related to each other in certain aspects. For example, the throughput or collection rate of permeate is directly related to the pressure applied across the semipermeable membrane; in general, the higher the applied pressure, the greater the rate at which permeate flows to the low pressure side of the membrane. However, higher pressures require higher amounts of energy, and applied pressures cannot be arbitrarily increased without limit because most semipermeable membranes do not have a physical structure capable of withstanding very high pressures. Moreover, the application of excessive pressure to certain semipermeable membranes may cause rupture of the membrane. When elevated pressures are employed not only to force the permeate through the membrane, i.e. as by overcoming the osmotic pressure of the solution, but also to drive the permeate along its flow path to a collection point in a spiral wound cartridge, the pressure losses that are experienced are sometimes referred to as side pressure loss, i.e., the resistance to flow of the permeate along or through a permeate carrier. The efficiency of a substrate material to permit liquid flow in the plane thereof has more recently been measured on a numerical scale to produce what is termed an H value, as described hereinafter.

In addition to providing physical support for the separately cast semipermeable membrane so as to prevent its stretching, sagging or rupture, such backing material has always functioned in a typical CF filtration module to provide an adequate flow path for the permeate to a collection point, i.e. as a permeate carrier. For example, typical CF filtration systems in widespread use today use a three-layer arrangement, including a semipermeable membrane layer, a mechanical reinforcing or anti-bagging support layer upon which the semipermeable membrane is directly cast, and a permeate carrier layer that primarily provides a flow path for the permeate. A popular permeate carrier in use today is comprised of tricot material, which is a knitted fabric, e.g. polyester, that is generally epoxy or melamine-coated.

A manufacturing process for making such spirally-wound semipermeable membrane cartridges for cross flow filtration purposes is illustrated in U.S. Pat. No. 4,842,736. Very generally, it has been traditional that a sheet of permeate carrier material 12 is wound about a porous collection tube 18 and additional leaves are joined thereto. In the arrangement, one such leaf of permeate material separates one folded sheet from the adjacent folded sheet of semipermeable membrane; sheets of feed supply material 16 are placed between the membrane surfaces of the facing halves of the folded membranes. These membrane sheets are formed by casting a base layer of semipermeable membrane 46 upon a porous felt backing layer 48, leaving a free upper surface upon which a thin, more discriminating layer can be formed for RO or NF purposes. In such a spirally-wound cartridge, the brine or other impure liquid being treated in the separation process is traditionally supplied to the active surfaces of the membrane by pumping it in an axial direction through the feed supply sheets disposed between the opposing faces of the folded membrane. This has proved to be a construction that is in wide use throughout the United States for NF and RO membranes, which membranes are commonly made from polyamide through an interfacial reaction upon the surface of a polysulfone base membrane (which may itself have UF capability) that had previously been cast upon a thin felt support layer. U.S. Pat. No. 4,855,058 shows a generally similar construction where permeate is discharged axially from one end of the filtration element; however, difficulty with seals has prevented widespread commercial acceptance.

U.S. Pat. No. 3,813,334 shows a spiral wound semipermeable membrane cartridge designed for cross flow filtration wherein the semipermeable membrane is cast in sheet form and then associated, as a part of a spirally-wound cartridge, with a first layer of felt, such as Dacron polyester felt sold commercially as Reemay 0601 that lies adjacent a resin-impregnated Dacron polyester tricot. The tricot fabric is specially formed so as to have an array of parallel wide ribs and narrow grooves that provide alternating channels in its distal surface, which abuts a similar surface. The cartridge thus includes a plurality of envelopes of membrane, bonded one to another along three edges, with such two-ply backing material facing each other and staggered with the ribs aligned with the opposite grooves or channels that provide open flow passageways through which the permeating liquid can readily flow to a central collection tube.

U.S. Pat. No. 5,500,167 teaches making a filtration medium for use in treatment filters wherein a porous nonwoven fibrous support material is coated with a first casting solution having properties so as to produce pores of a relatively large size, which is in turn coated with a second casting solution designed to create a porous material having pores of a substantially smaller size. The casting solutions are of polymeric material, such as polysulfone, and are simultaneously gelled so as to create an integral structure incorporating the nonwoven substrate. U.S. Pat. No. 5,804,280 teaches making a composite filtration material wherein a polysulfone disk having concentric grooves on opposite surfaces that drain to a central channel is covered on each surface by a wet laid, polyester, nonwoven fibrous felt that serves as a support and drainage medium; it is in turn covered by a polyamide fiber porous medium and then by layers of spunbond polypropylene. The overall arrangement is clamped between aluminum plates and then subjected to solvent bonding to join the adjacent layer to the substrate to result in a composite structure.

Although tricot material has frequently been a popular choice as a permeate carrier, other carrier materials have been investigated in a search to find even better materials, e.g., having even lower resistance to liquid flow; for example, non-woven polypropylene carriers have been used in a few instances. U.S. Pat. No. 4,802,982 discloses spiral wound membrane constructions for use in UF and RO separation processes wherein semipermeable membranes are cast upon a polypropylene or polyester felt backing layer and then associated with a ribbed permeate carrier. Some polytetrafluoroethylene membranes were laminated onto a polyester tricot carrier to provide cross flow constructions that are then compared to the inventive arrangement wherein the permeate pathway within each semipermeable membrane envelope constitutes a pair of carrier layers that employ parallel, cylindrical ribs interconnected by a weblike matrix, which ribs extend in the direction of permeate flow.

Although such specialty arrangements have proved useful in some limited areas, commercial manufacturers of cross filtration cartridges have generally continued to rely on tricot knitted material to provide the permeate carrier layer. One combination of materials frequently used in UF cross flow filtration cartridges includes a polysulfone membrane, typically about 4 mils in thickness, that has been cast on a felt backing material about 3–5 mils in thickness; such is associated with a tricot permeate carrier, such as K-1015 Hornwood tricot having a 48 wale rating, i.e., 48 threads per inch, and rolled to make cartridges from such materials, using a fabrication method such as that generally disclosed in the '736 patent.

More advantageous arrangements for CF membrane cartridges continue to be sought, particularly ones which will permit economies of production and thus provide commercial advantages.

SUMMARY OF THE INVENTION

Accordingly, it is an object of the present invention to provide a cross flow filtration cartridge constructed from a minimum number of layers of different materials, which exhibits side pressure losses low enough to permit its use with a variety of UF, NF and RO membranes, including those of more recent vintage that are capable of very low pressure operation.

Summarized briefly, the invention provides an arrangement wherein a polysulfone or other semipermeable membrane is formed upon and becomes integrally bonded to a fibrous sheet of material that serves as both the traditional membrane support substrate onto which casting occurs and the permeate carrier; this eliminates one major step in the production of cross flow membrane cartridges, such as multi-leaf spirally-wound cartridges, for use in separation applications. It simplifies production operations wherein the bonding or gluing of three edges of semipermeable membrane panels, from adjacent folded sheets, to each other has traditionally been carried out to create envelopes that surround permeate pathway-providing sheets which lead to a central collection tube, and it also inherently avoids potential problems of wrinkling of the permeate carrier material that are presently faced during production. The invention provides a material that also creates opportunities for innovative fabrication of other cross flow cartridges, such as single leaf or pleated designs.

More particularly, the invention provides a method for making a semipermeable membrane of sheet formation in situ upon polymeric fibrous support material that not only backs the membrane that is being cast thereupon, but that also provides excellent permeate flow pathways in the plane thereof so that a separate permeate carrier is no longer needed. A production method is preferably used wherein suitable polymeric fibrous support material is fashioned or suitably treated so as to provide an upper or outer surface which has a mean pore size no greater than about 300 microns, and wherein a liquid solution containing a polymeric resin, such as polysulfone, in a suitable solvent is cast onto this upper surface, followed by removal of the solvent to gel the cast layer and form a semipermeable membrane in situ. Such a polysulfone layer may serve as a UF membrane; however, for RO or NF applications, a more discriminating layer, e.g. a polyamide film, is then formed interfacially upon the polysulfone membrane which serves as a base membrane. The fibrous support material is selected to have such a sufficiently low resistance to liquid flow in the plane thereof as to allow its use in cross filtration cartridges, such as spirally-wound cartridges, without the association therewith of the traditional auxiliary permeate carrier; this totally eliminates the time-consuming association step in cross flow cartridge fabrication. In this respect, the material generally needs to exhibit a permeability for planar flow equal to only about one-half of that of the single permeate carrier which is presently used because, in standard cartridge arrangements, it will be placed in juxtaposition with a similar layer affixed to the facing semipermeable membrane to which bonding will occur to form the envelope.

In a further embodiment of the invention, the polymeric fibrous support medium is selected to have a thickness such as to provide adequate permeate flow for one entire leaf of a spirally-wound cartridge and both its surfaces will be fashioned to have a mean pore size in the range previously stated. In this embodiment, semipermeable membranes are cast onto the two opposite surfaces, for example while the support web is moving vertically downward. These cast layers are then simultaneously gelled, e.g. in a water tank or the like, to create an integral cross-filtration leaf which could be spirally wound directly with one or more sheets of feed spacer material to create a cross-flow filtration cartridge using a slightly different fabrication method. Such a fabrication method needs to handle only two types of sheet material, thus significantly simplifying any winding procedure, and is capable of winding a single leaf spiral membrane using only two sheets of material.

In a first particular aspect, the invention provides a method for making a semipermeable polymeric membrane of sheet formation integrally bonded to a polymeric fibrous support which allows excellent permeate flow in the plane thereof and thus finds use in cross flow filtration, which method comprises providing a fibrous support having a thickness of at least about 0.1 mm and an upper surface support region having a mean pore size no greater than about 300 microns, casting a layer of a liquid solution containing a membrane-forming polymer in a solvent onto said upper surface of said fibrous support, and removing said solvent to gel said layer and form a semipermeable membrane, whereby the resultant arrangement of a semipermeable membrane integrally bonded to a fibrous support exhibits sufficiently low resistance to liquid flow in the plane thereof to allow its use in membrane cartridges for cross flow filtration without association with an auxiliary permeate carrier.

In another particular aspect, the invention provides a method for making spiral wound cross flow filtration cartridges using semipermeable membrane of sheet formation bonded to an integral polymeric fibrous support layer which allows excellent permeate flow in the plane thereof, which method comprises the steps of (a) providing a fibrous support having a thickness of at least about 0.4 mm and one surface region which is physically different from a main central of said fibrous support, which surface region has a thickness of at least about 0.1 mm and a mean pore size no greater than about 200 microns, (b) casting a layer of a liquid solution containing a membrane-forming polymer in a solvent onto said one surface of said fibrous support, (c) removing said solvent to gel said layer and form a polymeric semipermeable membrane in situ upon said fibrous support, and (d) spirally winding said product of step (c) about a porous collection tube in association with feed-passageway-providing sheet material juxtaposed with the membrane surface of said product and in the absence of any separate permeate carrier to form a cross-flow filtration cartridge, whereby the resultant arrangement of said polymeric membrane integrally bonded to said fibrous support exhibits sufficiently low resistance to liquid flow in the plane thereof to allow its efficient use in spiral wound membrane cartridges for cross flow filtration without association with any auxiliary permeate carrier.

In a further particular aspect, the invention provides a membrane cartridge for use in cross flow filtration, which cartridge comprises semipermeable membrane material of sheet formation which includes a polymeric semipermeable membrane and an integral support layer which allows excellent permeate flow in the plane thereof, said integral support layer consisting of a fibrous support sheet having a thickness of at least about 0.1 mm, one major surface of said fibrous support sheet constituting a region having a mean pore size no greater than about 300 microns, said fibrous support sheet having a permeate carrier efficiency with respect to aqueous flow in the plane thereof measured as an H value of not more than about 100 atm/sec/ml, said semipermeable membrane being integrally bonded to said one surface region of said fibrous support as a result of having been formed in situ thereupon by casting a layer of a liquid solution containing a membrane-forming polymer in a solvent onto said one surface of said fibrous support sheet and thereafter removing said solvent to gel said cast layer.

DETAILED DESCRIPTION OF THE PREFERRED EMBODIMENTS

The present invention provides improved sheet-like semipermeable membrane material for employment in cross flow filtration processes. More particularly, the invention provides novel methods for making such material and for making cross flow filtration cartridges with such material and also provides novel cross flow filtration cartridges, particularly spirally-wound cartridges, having designs that were prompted by the incorporation of such material.

In cross flow filtration devices, the liquid solution, for example saline or brackish water, which is often referred to as brine, is traditionally pumped axially through the spiral windings of such a cartridge; the brine flows past the semipermeable membrane surface where it is gradually depleted in water as it travels to its exit, which is a result of the permeation of water through the semipermeable membrane. Traditionally, such membranes have been cast as relatively thin layers on a porous, strength-providing substrate so as to create sheet-like semipermeable membrane of desired width, that is then rolled and stored in roll form until used to fabricate cross flow cartridges. When spirally-wound cartridges are to be fabricated, sheeting from such a roll is associated with sheets of feed spacer material and sheets of permeate carrier material and rolled about a central tube to form a spirally-wound cartridge; a representative fabrication method is taught in the '736 patent. The present invention simplifies this fabrication process for the production of cross flow filtration membrane cartridges, such as spirally-wound cartridges, by casting the semipermeable membrane directly upon the surface of an appropriate fibrous support material that itself has low resistance to the flow of liquid in the plane thereof and therefore adequate capacity to itself transport a liquid permeate to a collection location, e.g. the traditional perforated central tube, while experiencing only an acceptably small pressure drop.

With the foregoing in mind, a fibrous support is selected from what might be referred to as high bulk polymeric materials, which have a high percentage of open space throughout the interior thereof, so that liquid can flow freely in the plane thereof. Generally, any types of polymeric fibers can be employed including polyesters, polyamides, aromatic polyamides, i.e. polyaramids such as Nomex, polyethersulfones, cellulose esters, acrylic polymers, fluoropolymers and other suitable polymeric fibers that are hydrophilic in nature, with some examples including nylons, polytetrafluoroethylenes and polyvinylidine fluorides. Of these various fibers, polyester fibers, such as Dacron fibers, because of cost and all-around performance, are generally preferred. The porous support is preferably a nonwoven material, and it may be either air-laid or water-laid or may be formed by processes such as melt-blowing and spun-bonding. For example, spun-bonded thermoplastic fibrous materials are described in U.S. Pat. No. 5,750,151. The fibers may be straight, or they can be crimped so as to increase the bulk of the resultant product and maximize open space. Two and three dimensionally crimped fibers are well known in the filtration fiber art as seen in U.S. Pat. No. 5,779,847. The size or diameter of the fibers can vary quite a bit. The term denier is frequently used to refer to the fiber thickness, and very generally, the denier of the fibers used in the polymeric fibrous support material may vary from about 10 microns to about 40 microns, with larger diameter, e.g. about 30 to about 40 microns, fibers being generally preferred because they inherently can provide a greater percentage of open space.

Of course, in addition to providing adequate porosity to keep the pressures relatively low, the porous fibrous support material must have sufficient structural integrity to continue to operate over the lifetime of the cross flow filtration element, and thus the fibrous structure should exhibit adequate resistance to compaction. It can be understood that, in a spirally-wound cross flow filtration element, for example, the porous support medium will be in effect sandwiched between two sheets of semipermeable membrane material, each of which will be under a higher pressure that is required to overcome the osmotic pressure of the solution being supplied to the semipermeable membrane and drive permeate through the membrane. Thus, the differential pressure between the feed side of the membrane in the operative cartridge and the permeate side produces forces bearing against both major surfaces of the support sheet that will need to be withstood by the structural integrity of the interior fiber support sheet which serves as the permeate carrier. This function is of course common in present-day cross flow filtration processes, and fibrous materials that are used are frequently impregnated with a dilute solution of epoxy or melamine resin. Such joins adjacent fibers to one another at crossover points and thus substantially increases their resistance to compaction without significantly detracting from the desirable open character of the material, as well known in this art.

Once the fibrous support sheet-like material has been selected, one or both of its surfaces are thereafter treated so as to modify their characteristics and render them suitable for casting a semipermeable membrane directly thereupon. When the intention is to create a traditional spirally-wound membrane cartridge, only one surface of the fibrous support is treated, and then this surface, oriented as the upper surface of a continuous web, will have a semipermeable membrane cast thereupon in a production-line casting apparatus. The semipermeable membrane will be a polymeric material that generally contains pores which are of the size sufficient to permit permeate to fairly readily pass through, and generally the pore size of the membrane will range from about 1 to about 5,000 nanometers. Generally, the semipermeable membrane will have characteristics that will qualify it as a UF membrane, i.e. one generally having asymmetry at its free surface; however, this is not an absolute criteria as a microporous base membrane may be first cast upon the surface of the fibrous support, followed by the formation of a thin, highly discriminating film on the upper surface thereof to form what is commonly referred to in the trade as a thin film composite membrane that may have either NF or RO characteristics. When such a microporous or UF layer is used as a base membrane for an RO or NF membrane, a thin, highly discriminating film is traditionally formed thereupon using well known interfacial condensation techniques. When a polyamide RO or NF film, for example, is to be formed, the base membrane may be first coated with an aqueous amine solution, after which an interfacial reaction is carried out with an organic solution containing triacyl chlorides. When RO membranes are to be formed on both surfaces, it may be preferable to form them sequentially; however, this would mainly depend upon the casting equipment readily available.

Examples of polymers which may be used to provide such base membranes include polysulfones, polycarbonates, polypropylenes, polyamides, polyphenylene ethers and polyvinylidine fluorides. Polysulfones are preferred and are widely used throughout the world today to provide UF membranes that have some asymmetry at their free upper surface and are also suitable to serve as base membranes for RO or NF membranes. Generally, the polysulfones will have an average molecular weight between about 20,000 and about 200,000 and preferably between about 50,000 and about 150,000. Of course, instead of casting a UF membrane onto the surface of the treated fibrous support material and then adding a thin film to provide an RO membrane, traditional asymmetric RO membranes might be directly cast thereupon using cellulose acetate, cellulose triacetate or any of the other materials that have routinely been employed since reverse osmosis was in its infancy in the 1950's and 60's.

The casting of such semipermeable UF membranes is well known in the art and is taught, for example, in U.S. Pat. Nos. 4,690,765, 4,614,586 and 5,132,059. The fibrous support material may have substantially any desired width; for production line coatings, a width of about 12 inches (about 30 cm) to about 60 inches (about 150 cm) is frequently used for economies of production. Although the width of the material web that is to be coated will generally be at least about 12 inches (30 cm), there is no reason why narrower webs not could be used if desired for a particular purpose.

When it is desired to make a double-sided semipermeable membrane construction, both surfaces of the fibrous support sheeting are first treated to provide the desired surface characteristics. Thereafter, as explained hereinafter, semipermeable membranes are cast onto both opposite surfaces of the fibrous support. This can be done sequentially but is preferably effected simultaneously, or at least nearly simultaneously, to achieve economy of production. In a particularly preferred embodiment, casting is carried out in a vertical orientation using a trough longer than the width of the fibrous support for a purpose mentioned hereinafter.

The surface of the fibrous support material having the desired open porosity and low resistance to liquid flow in the plane thereof is treated either by physically altering its surface region or by suitably supplementing the surface region. The surface region may be altered by the application of heat to thermoplastic polymeric fibers that will then cause the fibrous surface to density. Heat may be applied in a variety of ways, as by calendering with a heated roller or by direct application using flame, radiation or convection. The upper surface region of a thermoplastic fibrous nonwoven material may be also be densified by exposure to an oxygen or helium plasma, as exemplified by U.S. Pat. No. 6,074,869. The surface may alternatively be treated to modify its characteristics by supplementing with additional material as by melt-blowing, i.e. employing either particulate polymer or a thin layer of polymeric film material that is compatible with and melts so as to be joined to the existing surface and form a surface region having the desired characteristics. Alternatively, the surface treatment may utilize the appropriate permanent joinder of a thin scrim of nonwoven fibrous material of small diameter fibers that would then become the surface region of the fibrous support. Suitable joinder can be done mechanically, chemically or physically as, for example, by calendering, by solvent or adhesive bonding or by the application of heat, to cause the permanent joinder of thermoplastic surfaces to one another.

Such treatment is carried out so that the fibrous support is provided with a surface that is strong, uniform and which has a sufficiently low bubble point and narrow pore size distribution so as to promote good adhesion of the polymeric material from which the semipermeable membrane will be cast while minimizing casting solution bleed or strike through the surface into the interior of the fibrous support that is serving the permeate carrier function. Very generally, the resultant surface should have a mean pore size between about 1 and about 300 microns with the pores ranging from about 0.1 micron to about 500 microns. Preferably, the mean pore size is not greater than about 200 microns. The actual thickness of the surface region may vary a fair amount, being relatively thin when a melt-blown surface is employed, e.g. for example about 1 to 5 microns. However, it will generally have a thickness of between about 0.1 mm and about 1 mm; slightly thicker surface regions may be employed within a reasonable range taking into consideration the general spatial requirements well known in designing spiral-wound membrane cartridges. Commonly, the surface region will be between about 0.1 and about 0.3 mm in thickness when the fibrous support has a thickness of at least about 1 mm.

The resistance to flow of liquid through a permeate carrier is very frequently referred to by the criterion termed. H value. H value is defined in Appendix A attached hereto and is a value that is frequently expressed in units of atmospheres/second/ml. It is commonly expressed as a value that is a characteristic for a particular fibrous material of a given thickness; accordingly, the fixed value will change if the thickness of the fibrous material is changed. For example, the H value for a particular fibrous material would be reduced by approximately one-half if the thickness of the material were doubled. Thus, it can be seen that, the lower that the H value is, the more valuable a fibrous material will be as a permeate carrier. In this respect, it is felt that the H value of fibrous material that is used to support a semipermeable membrane on only one surface should not exceed about 100, and preferably the H value is about 20 or less, more preferably about 10 or less and most preferably not greater than about 1, with of course the understanding that even lower values will represent lower resistance to liquid flow through the material. Accordingly, in the standard leaf arrangement for a spiral wound cartridge, the H value of the composite leaf, comprising two juxtaposed permeate carrier layers, would be 50 or less, and preferably about 10 or less.

It should be generally understood that spirally-wound cartridges can be made with individual leaves having a wide variation in length; for example, leaves might be as short as about 10 inches or less or as long as 70 inches or even greater. As a result, it should be understood that, when the intention is to use the integrally bonded semipermeable membrane-fibrous support material in a spirally-wound cross flow cartridge utilizing fairly long leaves (so that there would be a fairly long average path to a traditional central collection tube), fibrous support materials having a H value near the lower end of the aforementioned range might be chosen. On the other hand, if either short leaves were intended to be employed or if an arrangement were to be used wherein the permeate flow path would be lateral (with the feed solution being pumped spirally either to or from a central perforated tube) a fibrous support approaching the upper end of the H value range might instead be employed. Of course, when the intention is to treat both surfaces of the sheet-like fibrous support so as to provide semipermeable membranes on opposite surfaces thereof, the aforementioned H values should not exceed about 50 atm/sec/ml (as mentioned above for the present composite leaf).

Although a nonwoven fibrous support material is preferred, appropriate knitted or woven materials might be employed through modification of one or both surfaces by supplementation, as nonwoven fibrous felt a few mils in thickness would adequately bridge the peaks and valleys inherent in a woven or knitted structure and provide a substrate of sufficient thickness and the desired porosity for casting a semipermeable membrane directly thereupon. For example, thin polyester fiber felt or scrim material, such as that marketed by BBA Nonwovens, AWA, Crane, Powell and Ahlstrom, having thickness of 2 to 5 mils and a density in the range of about 30 to about 90 grams per square meter may be employed. It could be suitably bonded, as by heat or solvent or adhesive, to an underlying permeate carrier material so as to become an integral part thereof upon which casting can be carried out.

As previously mentioned, casting semipermeable membranes onto the surface of a suitable fabric support has been practiced for several decades and is well known in the art, being the subject matter of a multitude of U.S. patents. For example, in U.S. Pat. No. 5,258,203, the creation of a microporous polysulfone membrane that will serve as a substrate for RO membranes is taught by knife casting a 16% solution of polyethersulfone in DMF containing about 0.3% water onto a polyester sailcloth material. Casting is carried out at a knife clearance of about 5.5 mil, and the sailcloth bearing the cast solution or dope is immersed in a water bath about 2 seconds following casting to produce the microporous polysulfone substrate. Such knife-casting solution procedures are in common use throughout the world for producing ultrafiltration membranes and/or microporous substrates having average pore sizes of less than about 20 nm, and they may be expediently used when the membrane is formed only on the upper surface of the fibrous support.

When it is desired to form semipermeable membranes on opposite surfaces of a single fibrous support, a casting procedure such as that disclosed in U.S. Pat. No. 6,090,441 may be employed where dope layers are simultaneously cast upon the opposite surfaces from opposite reservoirs flanking a vertically moving web or from a composite reservoir through which the web is passed centrally downward therethrough. Alternatively, the web can be passed through a single reservoir having an exit opening that is controlled so as to leave a layer of dope of the desired thickness on both surfaces thereupon. The coated web would then be directed into a water bath which preferably has sufficient depth so that the solvent will be extracted by the water so as to sufficiently gel the membrane to give it integrity before there is any contact with a roller, all as generally known in this art.

Once such material has been produced, it may be used directly or may be stored in roll form prior to its use in fabricating spirally-wound cross flow filtration membranes as is common in this industry. As previously mentioned, the fabrication procedure basically as set forth in detail in the '736 patent may be employed with support material coated on only one surface, wherein lengths of the material approximately twice as long as the desired leaf are folded in half with the semipermeable membrane surfaces on the inside and separated from each other by a sheet of feed spacer material that provides a brine passageway axially through the resultant cartridge. Of course the present invention obviates the need to carefully position permeate carrier sheet material between the adjacent folded leaves of semipermeable membrane, thereby greatly simplifying fabrication and avoiding potential wrinkling problems. A subassembly which contains the feed spacer sheet is then associated with additional folded subassemblies in such a multi-leaf spiral arrangement, and the lateral and end edges of the facing membrane constructions are sealed, usually adhesively, so as to create a pocket of permeate carrier material sandwiched between a pair of facing sheets of semipermeable membrane. Once the assembly is complete, this lay-up is then rolled about a perforated central tube to form the cartridge, as well known in this art. Alternatively, if a cartridge employing a single spiral leaf is desired, a construction wherein semipermeable membranes are formed on opposite surfaces of a central permeate carrier region may advantageously be used; of course, two such single surface semipermeable membrane units might instead be juxtaposed with the permeate carrier surfaces in contact with each other. Spirally rolling would then be carried out in association with a sheet of spacer material that will provide the brine passageway through which the aqueous solution being treated can be pumped either axially in the traditional arrangement, or spirally while removing the permeate from one of the side edges as explained hereinafter.

The following examples setting forth certain illustrations of use-of the invention should aid in this understanding. However, it should be understood that these examples are only illustrative and are not meant to constitute limits upon the invention.

EXAMPLE 1

A Reemay 2440 polyester fiber spun-bonded felt, a product of BBA Nonwoven, is chosen which has a thickness of about 21 mils (0.53 mm) and a density of about 98 grams per square meter of surface. A thin, melt-blown polyester surface is added using known techniques for heating minute particles or thin fibers of polyester to a temperature above their fusion temperature so that a microporous layer builds up on the surface of the fibrous mass. The conditions are controlled so as to create a thin surface region between about 0.5 and 2 mils (0.01 mm–0.05 mm) which has a mean pore size between about 180 and 200 microns.

Following modification of one surface of the 21-mil Reemay material to create such an asymmetric fibrous support, a standard casting operation is effected using a solution containing 18% by weight of Udel 35,000 polysulfone in DMF as a casting dope. This polysulfone, which has a molecular weight of about 35,000, is cast at a knife clearance of about 8 mil and is immersed in a water bath about 180 seconds following casting to produce a semipermeable membrane of the ultrafiltration type which can alternatively be used as a base for producing a thin film RO or NF membrane. The material is transported through the water bath until substantially all of the DMF solvent has been removed, leaving a continuous web of material in the form of a polysulfone membrane about 2.5 mils thick atop the 21 mils thick felt. After preliminary drying, the composite material is ready for use in ultrafiltration separation operations.

A cross flow filtration cartridge is prepared for demonstration purposes by folding a length of the material about 7 feet long upon itself, or by simply associating two equal lengths with each other, with the 21 mil thick Reemay spun-bonded material in surface-to-surface contact, to provide a composite permeate carrier of desired thickness. The edges of these rectangular sheets are appropriately sealed with adhesive to create an elongated envelope that is open only at one end. The open end is then associated with a porous region of a collection tube as well known in this art, and the envelope is rolled spirally about the tube together with a sheet of equal length of Vexar 28-mil thick feed spacer material to produce a spirally-wound cartridge. Such an assembled demonstration cartridge, about 1.8 inches in diameter, surrounding a collection tube of about 0.5 inch in inside diameter, is installed in a test apparatus to determine its capability for cross-flow UF separation. It exhibits excellent performance, and the composite permeate carrier is found to have an H value of less than 5 atm/sec/ml.

EXAMPLE 2

A spun-bonded polyester fibrous open felt material, which is commercially sold as Reemay No. 2415 (a product of BBA Nonwoven), that is 16 mils thick and has a density of about 53 grams per square meter of surface is joined with a more dense calendared polyester nonwoven fibrous felt sold by Snow Filtration (a division of BBA Nonwovens) as 2.0 oz material. It is used to provide a surface casting region which will be about 4.7 mils (0.12 mm) thick and is substantially more dense, having a density of about 67 grams per square meter surface; it has a mean pore size of 10 microns. These two webs of sheet material are united by feeding between them a very thin sheet or web that is of spider web-like construction of low melting polyester fiber material; it should melt about 10° to 20° C. below the melting point of the polyester of the fibers from which the Reemay and Snow Filtration webs are fashioned. The three webs are run between a set of calender rolls with low calendering pressures, and a temperature just high enough to melt the thin intermediate layer. Melting of the intermediate layer effects a permanent joinder between the two fibrous layers that are sandwiched about it, forming bonds from the melted polyester at junctions between fibers in the Reemay felt and the calendered felt and creating an asymmetric fibrous support.

The casting operation as described in Example I is repeated to produce a similar polysulfone UF membrane about 2–3 mil thick in situ upon the calendered felt. The cartridge fabrication process is then repeated to produce a demonstration cross flow UF separation cartridge that is then tested. Performance is very good, and calculations show that the overall envelope has an H value of less than 5 atm/sec/ml, which means that the surface-modified 16 mil thick layer of Reemay 2415 has an H value of less than 10 atm/sec/ml. The overall arrangement is considered to be fully acceptable for use in UF, NF and RO cross flow membrane cartridges.

EXAMPLE 3

An approximately 12 mil thick nonwoven polyester knitted material sold as Hornwood No. 1994 is associated with a very thin web of lower melting, spider web-like construction, polyester material as in Example 2. A 3 mil thick, more dense AWA-51 calendered polyester wet-laid fibrous material, having a density of about 70 grams per square meter of surface and a mean pore size of about 17 microns, is applied atop the thin web. A similar web of spider web-like construction material is associated with the opposite surface of the Hornwood material, and a second layer of AWA-51 more dense felt is juxtaposed atop of this to create a five-layer sandwich, with the two AWA layers on the outside. The fibrous lay-up is fed between a pair of heated calender rolls which add heat to both surfaces and raise the temperature sufficiently to melt the lower melting thin polyester web layer so as to permanently bond the facing surfaces of AWA calendered felt to the opposite outer surfaces of the Hornwood material, creating a highly porous fibrous material having symmetrically bonded surface layers of low porosity.

This symmetrical composite material is then coated using a polysulfone solution in DMF of the type described in Example 1 by passing it vertically downward through the center of a trough filled with the solution. The trough has knives set sufficiently far apart so that, when the composite fibrous web of about 18–20 mils thickness is fed through the trough, a wet film of about 7 to 9 mils is cast onto each surface thereof. The cast polymer film is quenched as before by immediately entering into water in a few seconds, and the coated web travels a sufficient distance in the water bath before coming in contact with a roller so that, consistent with the speed of the travel, the UF membrane will have sufficiently gelled so as to be substantially unaffected by passage over a direction-changing roller immersed in the water bath. Such coatings of the solution on each surface, after they have been quenched into water, result in a 2–3 mil thick polysulfone cast film on each surface.

A demonstration cross filtration membrane cartridge is fabricated generally as in Example 1 by sealing three edges to create a membrane envelope surrounding the interior permeate passageway-providing region, and spirally rolling the composite web-material along with a juxtaposed sheet of feed spacer material. The open edge of the envelope is carefully sealed to the surface of the collection tube so there can be no leakage thereinto of the liquid being treated. The demonstration cartridge functions well as a cross flow ultrafiltration membrane when run with an aqueous salt solution, and the H value is less than about 5 atm/sec/ml.

EXAMPLE 4

A nonwoven polyaramid fiber felt about 4–5 mils thick, e.g. a product of Crane & Co., Cranemat CX21, which is a blend of Nomex fibers, is chosen which has adequate characteristics for membrane support but poor casting characteristics. By its lamination to a thin calendered polyester felt, such as Cranemat SM 13.5, which is about 3 mils (0.08 mm) thick and has a density of about 52.5 grams per square meter of surface, one can provide a suitable casting surface. A thin spider-web-like web is sandwiched between the two felts as in Example 2 as a part of the lamination process. The 4–5 mil Cranemat polyaramid material has a mean pore size between about 20 and 100 microns and a porosity of about 35 l/m$^2$/sec @ 200 PA. The density is 0.70 g/cc, and the basis weight is about 80 grams per square meter of surface.

Two Cranemat CX21 layers, each having one surface laminated with a surface layer of polyester SM 13.5 web, are then joined together by inserting a very thin sheet or web of spider-web-like construction of low melting polyester fiber material between the facing opposite surfaces. The low melt polyester should melt about 10° to 20° C. below the melting point of the SM 13.5 polyester fibers. The four webs, i.e. two polyester sheets on the outside of the polyaramid fiber sheets, are run between a set of calender rolls with low calendering pressures and a temperature just high enough to melt the three spider-web-like intermediate layers. Melting of these intermediate layers effects a permanent joinder between the facing fibrous layers that are sandwiched about it, forming bonds from the melted polyester at junctions between fibers in the Nomex felt and the calendered felt and between the fibers in the two Nomex felts. The end result is a 16-mil thick material having a thin polyester surface suitable for casting on both sides of a polyaramid permeate carrier about 10–12 mils thick.

The casting operation as described in Example 3 is repeated to produce a similar polysulfone UF membrane about 2–3 mils thick formed in situ upon the calendered polyester felt. The cartridge fabrication process is repeated to produce a demonstration cross flow UF separation cartridge that is then tested. When tested at ambient temperature, performance is found to be very good. The H value, or the substrate/permeate carriers resistance to flow, is less than 5 atm/sec/ml which means that the four-layer, 16 mil thick laminated material is adequate for a permeate carrier as used in a spiral cartridge fabrication process. Because the substrate is primarily made of Nomex polyaramid fibers which have long chains of polymetaphenylene diamine that are stable at high temperature and exhibit good chemical resistance, such UF membranes are considered to be fully acceptable for use in UF cross flow membrane cartridges that will encounter high temperature and high pH operating conditions.

The novel design of the composite membrane permeate carrier of construction lends itself to substantial economies in membrane element fabrication, particularly in the field of spirally-wound cross flow filtration elements; the following examples demonstrate certain preferred fabrication processes utilizing these novel materials.

EXAMPLE 5

Symmetrical composite material having a polysulfone UF membrane on both surfaces, of the general type formed in Example 3 and having a total thickness of about 25 mils, is cut to a length of 36 inches (91.4 cm) to form a demonstration cartridge by rolling with a 36-inch sheet of feed spacer of equal width that is about 28 mils thick. For demonstration purposes, the width of both sheets is 14 inches (35.6 cm), and the casting is carried out using a trough about 15 inches (38.1 cm) long so that both surfaces of the composite membrane construction, and the side edges thereof are coated with the membrane casting solution, as a result of which the side edges are sealed as part of the membrane casting step. Then, only the trailing and the leading edges of the sheet cut from the long roll of the composite membrane need be sealed to totally envelop the permeate carrier layer. Sealing is carried out in any suitable manner which prevents the leakage of feed into the permeate carrier layer. Commonly, this is carried out with glue or other adhesive, or with tape in combination with gluing. Hot melt adhesive is often preferred because it hardens extremely quickly and thus can be handled essentially immediately. Alternatively, heat sealing can be used depending upon the particular membrane and permeate carrier materials that are employed; for example, if a nylon UF membrane is being used or if a polyester permeate carrier is being employed, both would lend themselves to heat sealing along the leading and trailing edges of the sheet cut from the roll. In the present instance, the sealing of these two edges is carried out using a standard polyurethane adhesive.

A 1.8 inch (4.57 cm) outer diameter demonstration element is provided by rolling one 36-inch length of sheet material cast on both sides about a central tube having an outer diameter of 0.6 inch (1.5 cm). The central tube may be provided with an elongated slot cut into it where the end of the single leaf and feed spacer can be inserted as generally taught in U.S. Pat. No. 3,397,790. More traditionally, there is simply a line of holes drilled through the central tube, and the feed spacer is wrapped around the tube to provide communication between the interior of the central tube and the feed spacer material through which the liquid being treated will be then pumped. The recovery is dependent on the flux of the membrane and the length of the leaves. It should of course be understood that multi-leaf elements can be rolled by cutting two or more slots evenly spaced about the perimeter of the tube as shown in the '790 patent, or by having rows of holes in the tube to provide for communication with multiple sheets of feed spacer that would be alternated with the sheets of composite membrane material. The characteristics of the feed spacer material are chosen, dependent upon the particular application, as well known in the art.

Adhesive sealing of the side edges of the feed spacer material can be effected as the rolling is being carried out in generally the same fashion as rolling traditional spiral elements. The side edges of the membrane surfaces are glued to the facing surfaces of the feed material so as to seal its edges and separate the feed side from the permeate exit side. However, a preferred method of fabrication which provides efficiency and reduces cost of manufacturing allows the composite membrane material and the feed spacer leaves to be simply wound about the central tube, and once the winding is complete, the ends of the wound element are alternatively potted in a urethane, epoxy or hot melt adhesive material to seal the entire end under conditions wherein the adhesive sealant will intrude a fair distance into the end of the porous feed material. This type of potting arrangement is disclosed in detail in U.S. Pat. No. 5,266,195 and also in the '058 patent. After the potting adhesive has hardened, the end is trimmed at a location which exposes the spiral edge of the permeate carrier region of the composite material (which was originally sealed by the cast membrane) while leaving the feed spacer still sealed, with the trimmed distance being usually about ¼ to ½ inch. In such an operating element, the permeate that has passed through the membrane needs to travel only the short length of the element to reach the end of its pathway in the element, instead of having to travel a very significant distance throughout the spiral winding in order to reach a central collection tube as is the case in the traditional element. Because there will of course be much lower pressure drop from this short permeate path, it may be possible to utilize less expensive materials for the permeate carrier compared to those sometimes utilized to facilitate permeate flow for a substantial distance.

To keep the permeate separate from the feed liquid which will be present in the region between the element exterior and the interior surface of the pressure vessel a collar, with one or preferably two O-rings, is glued over the potted end of the element near the trimmed edge through which permeate is being removed. O-rings are fitted into grooves in the exterior surface of the collar, and the use of a pair of O-rings provides a back-up against any potential leakage between the higher pressure on the feed liquid side and the lower pressure on the permeate side. By adhesively securing this collar onto the wound element using a plentiful quantity of adhesive to saturate the outer region of the porous feed spacer up to the region where the potting resin will intrude, assurance is obtained that feed pressure will not move the collar relative to the element and that there will be no leakage under the collar. In another aspect, the collar that is placed on the trimmed end of the spirally-wound element is preferably designed so that the free end of the collar or a short spacer inserted thereupon touches the end cap of the pressure vessel, as a result of which the pressure inside the vessel will push the element toward the end cap, and this will reinforce the sealing. Another alternative is to fit the collar over the end of the element and provide it with spokes connected to a ring that tightly abuts and is affixed to the central tube, as by adhesive attachement. When such a collar is then glued to the spirally-would element, the situation will resemble the traditional use of end caps that serve as anti-telescoping devices (ATDs). Of course, in a situation such as this where the feed flow is not from one end of the element to the opposite end (which inherently might give rise to such undesired telescoping action), but instead is either spirally inward or spirally outward through the feed spacer, the need for an ATD is much less if any at all. However, such attachment to the central tube provides further protection against possible movement and leakage.

Generally, one end of the central tube will be plugged, and the feed is pumped into the opposite end for passage through a slot or a series of holes and then travel spirally outward through the element. Sealing at the end where the feed is supplied can be by O-rings located either interior of the central tube or surrounding the exterior of an extended tube. Similarly, the inner diameter of the surrounding pressure vessel should be capable of sealing the feed region from the permeate located at one or both ends, using these O-rings carried by the collar. Whereas it might be possible to glue an element collar to a pressure vessel interior wall for a one-shot disposable arrangement by the use of adhesive as a seal for this purpose, more traditionally the element would be replaceable, and the pressure vessel would have a pair of end caps that are suitably interconnected with or clamped to the body of the pressure vessel.

As known in this art, the pressure vessel end caps can have various configurations. One end cap may have a single port located off the center through which the feed is pumped into a plenum chamber communicating with the exterior region of the element, with the feed flow being spirally from the outer surface to the interior edge associated with the central tube. The interior of this end cap could then serve as a dead-end plug for the central tube. The opposite end cap would have two holes or ports, one centered in the end cap for removal of the concentrate solution and a second hole that would be off center and would remove the permeate. It is common to associate a valve or some other restrictor with the tubing through which the concentrate is exiting in order to allow control of the pressure and the rate of flow of liquid through the element. An alternative mode of operation would change the connections so that the feed would be pumped into the central tube allowing the concentrate to exit from the outer end of the leaf and then out the end cap that serves to mount the blocked end of the central tube.

Using this general construction, a single UF membrane was cast from polyethersulfone having a molecular weight of about 15,000. An element having an outer diameter of about 1.8 inches and a membrane width of about 12 inches was wound from a sheet about 36 inches long as a single leaf spiral. Pumping a rate of about 228 gallons a day at 100 psig, the element produced permeate of about 38 gallons per day per square foot of membrane area. Reducing the feed pressure to about 80 psig and pumping at a rate of about 190 gallons per day through the element, the amount of permeate obtained was equal to about 31.7 gallons per day per square foot of membrane area. Dropping the pressure to only about 62 psig and pumping at a rate of about 151 gallons per day through the device, a permeate equal to about 25.1 gallons per day per square foot of membrane area was obtained. The performance of this element as a single leaf spiral was considered to be excellent.

EXAMPLE 6

The fabrication process described in Example 5 is repeated except that, following potting of both ends of the spirally-wound element, both ends of the element are then trimmed so as to expose the permeate channels on both side edges, and O-ring-carrying collars are secured to both ends. As a result, permeate will need to flow a distance in the permeate carrier layer no greater than only half the width of the membrane until it exits at one of the two opposite ends of the element. Thus, by taking permeate out both sides of the element, the average length of the permeate path is further shortened, and the element thus has an even lower permeate side pressure drop than that fabricated in Example 5. Using this arrangement, an element would be disposed within its own pressure vessel, and permeate would be removed from both ends of the pressure vessel. This would be in contrast with the element fabricated in Example 5 where two such elements could be located, if desired, in a single pressure vessel, with one discharging to each end. Thus, for example, in a 40-inch long spirally-wound element having a diameter of about 4 inches, it would only be necessary for the permeate to travel a maximum of about 19 inches through the permeate carrier material regardless of the number of leaves used in fabricating the 40-inch long element. In such an arrangement, however, a collar and O-ring sealing arrangement would be fixed to both ends of the element, and the feed liquid input and output would be through the central tube and via an outlet in the sidewall of the pressure vessel, for example.

The foregoing spirally-would element constructions are not limited to those wherein the membrane is simultaneously cast upon opposite surfaces of a composite layer material suitable for that purpose, but they can also utilize composite membrane permeate carrier material that is produced using the techniques generally set forth in Examples 1 and 2. For example, two pieces of flat sheet membrane, each having a semipermeable membrane cast onto one surface, are cut to length, and a sealed envelope or pocket is made by disposing the composites in surface-to-surface relationship and then sealing the edges. If desired, depending upon the overall fabrication process, it may be preferable to pre-unite the two sheets by heat-calendaring them with a thin spider-like web located therebetween. In this fashion, they could be thereafter easily handled as a single item in the fabrication process when they would be rolled with the sheet feed spacer material. Alternatively, they can simply be juxtapositioned, and the side edges and the leading and trailing edges can be sealed by gluing or heat-sealing to form an envelope, rather than forming the envelope during the rolling procedure, although such is feasible. In the latter such instance, adhesive might be applied to both surfaces of the membrane permeate carrier composite material so as to seal the side edges while a wider band of adhesive is applied to the feed spacer during the rolling operation to produce a seal of greater depth therein than that of the adjacent edge of the permeate carrier. After the glue has cured, trimming of one or both ends of the rolled unit would create the permeate exit, as described in Examples 6 and 7 above.

Alternatively, two composite membrane carrier layer sheets could be rolled together about a central tube in accompaniment with a feed spacer sheet without gluing the permeate sides at all, while restricting the application of glue to the feed spacer sheet and the facing membrane surfaces of the composite material. In this construction, the ultimate spiral-wound element would not require any potting or trimming as the side edges of the permeate channels are always left open.

As a still further alternative construction, an assembly similar to that fabricated in Example 3 might be fashioned by first casting UF membrane directly upon a three mil AWA calendared polyester, wet laid felt material. Two such pieces would then be cut to desired length, and a sheet of 12 mil, 34 whale, 16% epoxy-coated tricot is inserted between them in a sandwich-type arrangement. This could be a mere assocation, or they could be juxtaposed with spider web material between them as described in Example 3 and then hot-calendared in order to produce an interconnected composite dual membrane permeate carrier material. They could then be rolled together with a feed spacer sheet, the edges of which would be glued or sealed to the facing surfaces of the membrane while being adhesively closed to any flow through the edges. Again, there would be no trimming needed of the side edges of the element, if the permeate carrier material was kept free from adhesive, and thus an element would be provided from which permeate could be withdrawn from both opposite ends of the spirally-wound element.

In any of the foregoing arrangements, it should be understood that multiple leaves could be used as well as the single leaf that is described as generally being wound around a central tube to create a demonstration element. However, it is also felt to be important that this overall arrangement particularly lends itself to the fashioning of a single leaf element that is rolled into a very large diameter spiral, for example a 16-inch diameter spiral element, wherein the width of the membrane material would be about 40 inches. Depending upon the actual length, a feed spacer material of Vexar or the like is chosen that has sufficient porosity to allow the liquid solution being treated to be pumped spirally from one end to the other of this path of extended length. However, because of the fact that the average permeate path would be only about 10 to 12 inches, such a very long single leaf spiral winding becomes feasible, and it is of course easier and simpler to fabricate than is a multiple leaf spiral wound arrangement. Such very large diameter spiral elements for operation in a large pressure vessel would of course have some pressure restrictions, but in general they would work very well at pressures at about 150 psi or below.

In one more aspect, this type of construction particularly favors the-small so-called home reverse osmosis (HRO) units made from an asymmetric membrane, such as cellulose acetate, that are traditionally made using a single spiral; units with such composite membranes can be made in as short as five minutes using hot melt adhesives. Although it can be seen that the removal of the permeate from one of the side edges of such a spirally-wound element would deter the use of more than two such elements in a single pressure vessel, an encapsulation cartridge such as those taught in U.S. Pat. No. 5,108,604 might be employed in an overall arrangement where such cartridges could be manifolded to a common permeate line to collect the various permeate flows outside the vessel.

Although the invention has been described with regard to certain preferred embodiments which constitute the best mode known to the inventor for carrying out the invention, it should be understood that various changes and modifications as would be obvious to one having the ordinary skill in this art may be made without departing from the scope of the invention which is set forth in the claims that are appended. For example, although the invention has been illustrated by use in spirally-wound cross flow filtration devices wherein the feed flow is axially through the cartridge and the permeate flow is spirally inward to a porous collection tube, or vice-versa, it should be understood that equivalent cross flow filtration arrangements may similarly advantageously incorporate the products of the invention, including those which may employ pleated arrangements of the overall type generally depicted in U.S. Pat. No. 5,397,632. The disclosures of all of the aforementioned U.S. patents are expressly incorporated herein by reference.

Particular features of the invention are emphasized in the claims that follow.

Appendix

This report describes the theory, which explains how the membrane leaf length, the membrane water permeability, and the flow resistance of the permeate channel determine the permeate efficiency of the element.

Theory

Permeate Flux

The permeate flux through the membrane is obtained from Eq.(1).

$$J_w = A_m \cdot (P_b - P_p - \pi_b + \pi_p) \qquad (1)$$

$J_w$ is the permeate flux $A_m$ is the A-value (permeate permeability) of the membrane $P_b$ is the pressure on the feed side of the membrane $P_p$ is the pressure on the permeate side of the membrane $\pi_b$ is the osmotic pressure on the feed side of tile membrane $\pi_p$ is the osmotic pressure on the permeate side of the membrane Eq.(1) can be rewritten $$J_w = A_m \cdot (P_t - P_p) \qquad (2)$$

$$P_t = P_b - \pi_b + \pi_p \qquad (3)$$

Within a membrane element during normal operation, there is no big variation in the feed side pressure and tile osmotic pressures on the feed and permeate sides. $P_t$ can be treated as constant over a single element without a significant error.

Pressure Drop in the Permeate Channel

If $P_t$ is constant in the element, then the permeate flux is constant at constant membrane distance from the permeate tube, and the permeate flows in the radial direction only, towards the permeate tube.

The pressure change with fluid flow in a channel can be generally expressed with Eq.(4)

$$dP = -4 \cdot dx/d \cdot f \cdot 0.5 \cdot \delta \cdot v \qquad (4)$$

where dP is the pressure change dx is the distance for the pressure change $d_h$ is the hydraulic diameter, which in this case is defined as double the permeate spacer thickness $\delta$ is the fluid density v is a fluid velocity, which in this case is calculated assuming the permeate channel has the same thickness as the permeate spacer, and that the permeate spacer does not occupy any space.

f is the fanning friction factor and f is dependent only on the Reynolds number (Re= $d_h \cdot \delta/\mu$, where $\mu$ is the fluid viscosity) for newtonian fluids with a fully developed velocity profile. A fluid is newtonian when the viscosity is independent on the shear rate.

Note that the hydraulic diameter and the fluid velocity can be defined in any arbitrary way. The fanning friction factor correlation will change if these definitions change.

The pressure gradient in the permeate channel is for most, if not all, permeate channel spacers proportional to the local permeate flow rate. This means that the friction factor in Eq.(4) is inversely proportional to the velocity, and thus also to the Reynolds number. Then $f_L$ in Eq.(5) is independent on the Reynolds number or the flow rate in the permeate channel.

$$f_L = f \cdot Re \qquad (5)$$

Combining Eqs.(4) and (5) with the definition of the Reynolds number give $$dP_p/dx = -2\mu/(d_h^2) \cdot f_L \cdot v \qquad (6)$$

The velocity v can be calculated from the volume flow rate Q in the channel of width W.

$$v = Q/(W \cdot d_h/2) \qquad (7)$$

Eqs.(6) and (7) give $$dP_p/dx = -4\mu/(d_h^3) \cdot f_L \cdot Q/W \qquad (8)$$

H is defined according to Eq.(9)

$$H = 4\mu/(d_h^3) \cdot f_L \qquad (9)$$

H is thus dependent on the permeate channel construction (through $f_L$ and $d_h$) and the fluid viscosity.

The second derivative of the permeate pressure with regard to x is obtained from Eqs.(8) and (9).

$$d^2P_p/dx^2 = -H/W \cdot dQ/dx \qquad (10)$$

FIG. 1 describes the flow in the permeate channel. At the distance x from end of the membrane leaf, the permeate flow rate per unit width is Q(x), and the permeate flux is $J_w(x)$. Between x=L and the permeate tube (x=$L_i$), the membrane is impermeable The permeate pressure is $P_p(x)$ at location x, $P_L$ at x=L and $P_i$ in the permeate tube.

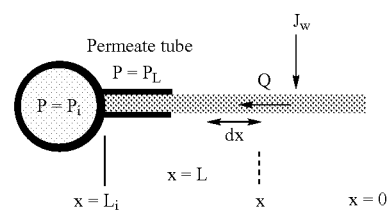

FIG. 1. A permeate Channel Spacer Attached to a Permeate Tube, and Surrounded by Membrane.

The permeate flow rate, Q, increases in the permeate channel with increasing x until x=L, because of the permeate flux through the membrane. Over the distance dx and width W, the permeate flux contributes to an additional permeate flow, dQ, according to Eq.(11). The membrane covers the channel on two sides.

$$dQ = J_w(x) \cdot 2 \cdot W \, dx \tag{11}$$

For $0 \leq x < L$, Eqs.(2) and (11) give $$dQ/dx = 2 \cdot W \cdot A_m \cdot (P_t - P_p) \quad 0 \leq x < L \tag{12}$$

Eqs.(10) and (12) give $$d^2P_p/dx^2 = -2 \cdot H \cdot A_m \cdot (P_t - P_p) \quad 0 \leq x < L \tag{13}$$

Define $$z^2 = 2 \cdot H \cdot A_m \tag{14}$$

Eq.(13) and definition (14) give $$d^2P_p/dx^2 - z^2 \cdot P_p = -z^2 \cdot P_t \quad 0 \leq x < L \tag{15}$$

Eq.(15) is a linear inhomogeneous differential equation of the second order with constant coefficients. Such an equation is not difficult to solve. The complete solution is the sum of two parts. The first part is the solution to the homogeneous equation, which is Eq.(15) with the right side replaced by zero. The characteristic polynomial, $r^2 - z^2 = 0$, is used to obtain this solution $((P_p)_h)$.

$$(P_p)_h = C_1 \cdot e^{zx} + C_2 \cdot e^{-zx} \tag{16}$$

where $C_1$ and $C_2$ are constants to be determined from the boundary conditions.

The second part of the solution is any particular solution. One such one is $$(P_p)_p = P_t \tag{17}$$

Summation of Eqs.(16) and (17) give $$P_p(x) = P_t + C_1 \cdot e^{zx} + C_2 \cdot e^{-zx} \tag{18}$$

There are two boundaries, x=0 and x=L. The pressure at x=0 is not known. However, the flow rate in the permeate channel, v, is zero at x=0, and then according to Eq.(6)

$$[dP_p(x)/dx]_{x=0} = 0 \tag{19}$$

Eqs.(18) and (19) give $$C_2 = C_1 \tag{20}$$

At x=L, the permeate pressure is $P_L$, and this together with Eqs. (18) and (20) give $$C_1 = (P_L - P_t)/(e^{zL} + e^{-zL}) \tag{21}$$

Eqs.(18), (20) and (21) give $$P_p(x) - P_L = (P_t - P_L) \cdot [1 - (e^{zx} + e^{-zx})/(e^{zL} + e^{-zL})] \tag{22}$$

Between x=L and $x=L_i$, the permeate flow rate is constant and denoted $Q_L$. Eqs.(8) and (9) then give $$P_i - P_L = -(L_i - L) \cdot H \cdot Q_L / W \tag{23}$$

Eqs.(22) and (23) give $$P_p(x) = P_t - (P_t - P_i - (L_i - L) \cdot H \cdot Q_L / W) \cdot [(e^{zx} + e^{-zx})/(e^{zL} + e^{-zL})] \tag{24}$$

Eq.(12) is integrated to solve for $Q_L$ $$Q_L = 2 \cdot W \cdot A_m \cdot \int_0^L (P_t - P_p) \, dx \tag{25}$$

Eqs.(24) and (25) give $$Q_L = 2 \cdot W \cdot A_m \cdot (P_t - P_i) \cdot \int_0^L \frac{e^{zx} + e^{-zx}}{e^{zL} + e^{-zL}} \, dx - 2 \cdot A_m \cdot (L_i - L) \cdot H \cdot Q_L \cdot \int_0^L \frac{e^{zx} + e^{-zx}}{e^{zL} + e^{-zL}} \, dx \tag{26}$$

Eqs.(14) and (26) give $$Q_L = \frac{2 \cdot W \cdot A_m \cdot (P_t - P_i) \cdot \int_0^L \frac{e^{zx} + e^{-zx}}{e^{zL} + e^{-zL}} \, dx}{1 - z^2 \cdot (L_i - L) \cdot \int_0^L \frac{e^{zx} + e^{-zx}}{e^{zL} + e^{-zL}} \, dx} \tag{27}$$

Integration of Eq.(27) and using definition (28) of tangens hyperbolicus (tanh) give Eq.(29)

$$\tanh(x) = \frac{e^x - e^{-x}}{e^x + e^{-x}} \tag{28}$$

$$Q_L = \frac{2 \cdot W \cdot L \cdot A_m \cdot (P_t - P_i) \cdot \frac{\tanh(z \cdot L)}{z \cdot L}}{1 - z^2 \cdot L \cdot (L_i - L) \cdot \frac{\tanh(z \cdot L)}{z \cdot L}} \tag{29}$$

Eqs.(24) and (29) give $$P_p(x) = P_t - \frac{P_t - P_i}{1 + z^2 \cdot L \cdot (L_i - L) \cdot \frac{\tanh(z \cdot L)}{z \cdot L}} \cdot \frac{e^{zx} + e^{-zx}}{e^{zL} + e^{-zL}} \tag{30}$$

The Permeate Efficiency

The permeate efficiency, $\eta_p$, is the permeate flow rate from the element, divided with what the permeate flow rate would have been with zero pressure drop in the permeate channel. In the latter case, the permeate pressure is constant, and equals to $P_i$ over the whole length of the permeate channel. Eq.(25) gives $$\eta_p = \frac{\int_0^L (P_t - P_p(x)) \, dx}{\int_0^L (P_t - P_i) \, dx} \tag{31}$$

Eqs. (30) and (31) give $$\eta_p = \frac{1}{1 + z^2 \cdot L \cdot (L_i - L) \cdot \frac{\tanh(z \cdot L)}{z \cdot L}} \cdot \frac{1}{L} \cdot \int_0^L \frac{e^{zx} + e^{-zx}}{e^{zL} + e^{-zL}} \, dx \tag{32}$$

$$\eta_p = \frac{\frac{\tanh(z \cdot L)}{z \cdot L}}{1 + z^2 \cdot L \cdot (L_i - L) \cdot \frac{\tanh(z \cdot L)}{z \cdot L}} \tag{33}$$

Definition (14) and Eq.(33) give $$\eta_P = \frac{\frac{\tanh\sqrt{2\cdot H\cdot A_m}\cdot L}{\sqrt{2\cdot H\cdot A_m}\cdot L}}{1+2\cdot H\cdot A_m\cdot L\cdot (L_i-L)\cdot \frac{\tanh\sqrt{2\cdot H\cdot A_m}\cdot L}{\sqrt{2\cdot H\cdot A_m}\cdot L}} \quad (34)$$

The permeate efficiency of the membrane is thus a function of 1) the permeate channel length, 2) the A-value of the membrane, which is dependent on the pressure and temperature, and 3) the H-value of the permeate channel, which is dependent on the spacer itself, the membrane backing material, operating pressure (pressure compaction) and the permeate viscosity.

The H-value is directly proportional to, and the membrane A-value is roughly indirect proportional to the permeate viscosity. Thus, a temperature decrease, which will increase the permeate viscosity, will not affect the permeate efficiency very much. At high pressures, a temperature increase will decrease the permeate efficiency, because pressure compaction of the channel becomes worse at higher temperatures.

The invention claimed is:

1. A method for making a semipermeable polymeric membrane of sheet formation integrally bonded to a polymeric fibrous support which allows excellent permeate flow in the plane thereof and thus finds use in cross flow filtration, which method comprises:
   providing a fibrous support having a thickness of between about 0.4 mm and about 2 mm and of similar properties throughout,
   treating an upper surface of said fibrous support to change its character and create an upper surface support region of a different character between about 1 micron and 0.3 mm thick and having a mean pore size of between about 1 micron to 300 microns by melt-blowing particles of polymer thereonto or by wet-laying a layer of polymeric fibers thereonto,
   casting a layer of a liquid solution containing a membrane-forming polymer in a solvent onto said upper surface of said fibrous support, and
   removing said solvent to gel said layer and form a semipermeable membrane,
   whereby the resultant arrangement of a semipermeable membrane integrally bonded to a fibrous support exhibits sufficiently low resistance to liquid flow in the plane thereof to allow its use in membrane cartridges for cross flow filtration without association with an auxiliary permeate carrier.

2. The method of claim 1 wherein said fibrous support which is used has a thickness of between about 0.4 mm and about 1 mm and a width of at least about 30 cm, and exhibits a low resistance to aqueous flow in the plane thereof, as measured by an H value of not more than about 100.

3. The method of claim 1 wherein said fibrous support is treated to change its character to provide said upper surface support region which has a pore size no greater than about 200 microns.

4. The method of claim 1 wherein said upper surface support region is provided by, melt-blowing particles of polymer thereonto.

5. The method of claim 1 wherein said fibrous support is a nonwoven material.

6. The method of claim 1 wherein said upper surface support region is provided by wet-laying a layer of polymeric fibers thereonto.

7. The method of claim 4 wherein said upper surface support region has a thickness between about 1 and about 5 microns.

8. A method for making spiral wound cross flow filtration cartridges using semipermeable membrane of sheet formation bonded to an integral polymeric fibrous support layer which allows excellent permeate flow in the plane thereof, which method comprises the steps of
   (a) providing a fibrous support having a thickness of about 0.4 mm and opposite surface regions which are physically different from a main central region of said fibrous support, each of which surface regions has a thickness of at least about 0.3 mm and a mean pore size of between about 1 micron 200 microns,
   (b) casting a layer of a liquid solution containing a membrane-forming polymer in a solvent onto both said surfaces of said fibrous support,
   (c) removing said solvent to gel said layer and form a polymeric semipermeable membrane in rifle upon both said surfaces of said fibrous support, and
   (d) spirally winding said product of step (c) about a porous tube in association with feed-passageway-providing sheet material juxtaposed with the membrane surface of said product and in the absence of any separate permeate carrier to form a cross-flow filtration cartridge,
   whereby the resultant arrangement of said polymeric membrane integrally bonded to said fibrous support exhibits sufficiently low resistance to liquid flow in the plane thereof to allow its efficient use in spiral wound membrane cartridges for cross flow filtration without association with any auxiliary permeate carrier.

9. The method of claim 8 wherein the H value of said integral support layer is not greater than about 100 atm/sec/ml.

10. The method of claim 9 wherein said fibrous support sheet includes a major region of polymeric fibers of between about 30 and about 40 microns in diameter.

11. The method of claim 8 wherein the H value of said integral support layer is not greater tan about 50 atm/sec/ml.

12. The method of claim 8 wherein the H value of said integral support layer is not greater than about 20 atm/sec/ml.

13. The method of claim 8 wherein said opposite surfaces of said fibrous support of similar fibrous character throughout are treated to change the character of said surfaces.

14. The method of claim 13 wherein said layers are simultaneously gelled in an aqueous bath to produce said product having semipermeable membranes formed in situ on opposite surfaces.

15. A spirally wound membrane cartridge for use in cross flow filtration, which cartridge comprises:
   a central tube,
   semipermeable membrane material of double-sided sheet construction which includes a polymeric semipermeable membrane on opposite surfaces of an integral support layer which allows excellent permeate flow in the plane thereof,
   said integral support layer consisting of a fibrous support sheet having a thickness of 0.1 mm to 2 mm, said opposite surfaces of said fibrous support sheet constituting support regions having a mean pore size of about 1 to 300 microns,
said fibrous support sheet having a permeate carrier efficiency with respect to aqueous flow in the plane thereof measured as an H value of not more than about 100 atm/sec/ml,
said semipermeable membranes being integrally bonded to said surface support regions of said fibrous support as a result of having been formed in situ thereupon by casting a layer of a liquid solution containing a membrane-forming polymer in a solvent onto said surfaces of said fibrous support sheet and thereafter removing said solvent to gel said cast layer, and
said semipermeable membrane material being spirally wrapped about said central tube, together with a sheet of porous feed material, which is designed to transport feed liquid being treated, so as to form a cylindrical assembly.

16. The cartridge of claim 15 wherein said fibrous support sheet is between about 0.4 mm and about 2 mm thick and has a width of at least about 30 cm and wherein said surface support region is between 0.05 mm and 0.3 mm thick and has a mean pore size no greater than about 200 microns.

17. The cartridge of claim 15 wherein said surface support region has a thickness of at least about 0.1 mm and said fibrous support has a thickness of at least about 1 mm.

18. The cartridge of claim 15 wherein said fibrous support sheet includes a major region of nonwoven polymeric fibers of between about 30 and about 40 microns in diameter.

19. The cartridge of claim 15 wherein the H value of said integral support layer is not greater than about 50 atm/sec/ml.

20. The cartridge of claim 15 wherein said element is constructed so that said porous sheet of feed material is in communication with the interior of said central tube and its side edges are blocked and wherein one side edge of said spirally rolled permeate material is open for discharge flow of permeate therefrom.

21. The cartridge of claim 20 wherein a generally cylindrical collar is adhesively attached to the exterior surface of said cylindrical assembly and wherein means is provided to seal the exterior collar surface to the interior surface of a cylindrical pressure vessel to prevent any flow of liquid feed axially therepast.

* * * * *